United States Patent
Podar et al.

(10) Patent No.: US 7,245,614 B1
(45) Date of Patent: Jul. 17, 2007

(54) MANAGING ACCESS TO INTERNET PROTOCOL (IP) MULTICAST TRAFFIC

(75) Inventors: Sunil Podar, Sunnyvale, CA (US); Sampath Kumar Sthothra Bhasham, Santa Clara, CA (US); Kali P Mishra, San Jose, CA (US); Sunil K Chandrupatla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1079 days.

(21) Appl. No.: 09/893,763

(22) Filed: Jun. 27, 2001

(51) Int. Cl.
*H04L 12/28* (2006.01)

(52) U.S. Cl. ............... 370/389; 370/390; 370/432; 370/474

(58) Field of Classification Search ......... 370/389, 370/390, 392, 432, 401, 229, 230, 235, 468, 370/473, 474
See application file for complete search history.

(56) References Cited

U.S. PATENT DOCUMENTS

| | | | |
|---|---|---|---|
| 5,577,035 A * | 11/1996 | Hayter et al. | 370/395.4 |
| 5,872,771 A * | 2/1999 | Park et al. | 370/252 |
| 5,884,028 A * | 3/1999 | Kindell et al. | 709/234 |
| 6,101,180 A * | 8/2000 | Donahue et al. | 370/352 |
| 6,212,582 B1 * | 4/2001 | Chong et al. | 710/57 |
| 6,292,492 B1 * | 9/2001 | Bonomi et al. | 370/415 |
| 6,331,983 B1 * | 12/2001 | Haggerty et al. | 370/400 |
| 6,405,327 B1 * | 6/2002 | Sipple et al. | 714/39 |
| 6,421,342 B1 * | 7/2002 | Schwartz et al. | 370/392 |
| 6,512,776 B1 * | 1/2003 | Jones et al. | 370/432 |
| 6,577,599 B1 * | 6/2003 | Gupta et al. | 370/236 |
| 6,654,371 B1 * | 11/2003 | Dunstan et al. | 370/390 |
| 6,667,971 B1 * | 12/2003 | Modarressi et al. | 370/352 |
| 6,765,892 B1 * | 7/2004 | Leung et al. | 370/332 |
| 6,781,999 B2 * | 8/2004 | Eyuboglu et al. | 370/399 |
| 6,810,031 B1 * | 10/2004 | Hegde et al. | 370/351 |
| 6,826,612 B1 * | 11/2004 | Bosloy et al. | 709/227 |
| 6,850,495 B1 * | 2/2005 | Baum et al. | 370/256 |

OTHER PUBLICATIONS

Internet Engineering Task Force (IETF) Request for Comment (RFC) 2205, Braden et al., "Resource ReSerVation Protocol (RSVP)—Version 1 Functional Specification," Sep. 1997, 105 pages.
Internet Engineering Task Force (IETF) Request for Comment (RFC) 2236, "Internet Group Management Protocol," Version 2, Nov. 1997, 21 pages.
U.S. Appl. No. 09/745,909, entitled "Method and System for Authenticated Access to Internet Protocol (IP) Multicast Traffic," filed Dec. 21, 2000, 37 total pages.

\* cited by examiner

Primary Examiner—Wing Chan
Assistant Examiner—Andrew C. Lee
(74) Attorney, Agent, or Firm—Baker Botts L.L.P.

(57) ABSTRACT

A system for managing access to IP multicast traffic includes a join request manager within an access router. The access router includes a central processing unit (CPU) and a memory unit. The access router replicates multicast traffic flows for communication to one or more user devices within user systems coupled to the access router using a link. The join request manager receives a request to receive a multicast traffic flow, the request being received from one of the user devices within one of the user systems, and denies the request if a system metric is above a threshold.

17 Claims, 2 Drawing Sheets

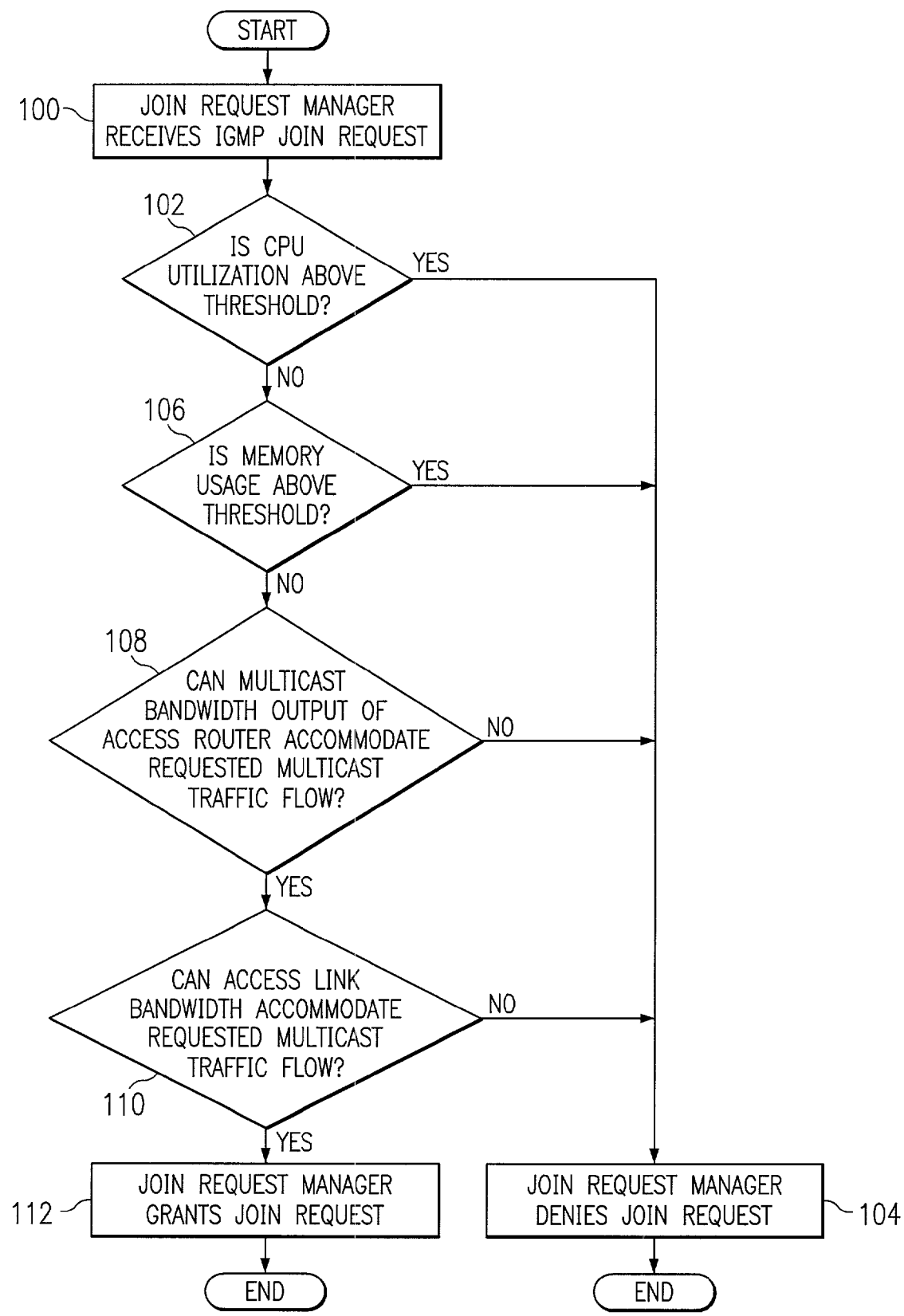

MANAGING ACCESS TO INTERNET PROTOCOL (IP) MULTICAST TRAFFIC

TECHNICAL FIELD OF THE INVENTION

This invention relates in general to the field of data communication and in particular to managing access to Internet Protocol (IP) multicast traffic.

BACKGROUND OF THE INVENTION

Multicasting provides for efficient point-to-multipoint data communication. In an IP multicasting environment, a single multicast traffic flow originates at a source and is replicated by routers at points where the network paths leading to the ultimate recipients of the multicast traffic diverge. Accordingly, a network link in a distribution tree carrying a multicast traffic flow to multiple user devices need only carry one copy of the multicast traffic flow, thereby conserving core and access network bandwidth, easing the burden on individual routers in the distribution tree, and allowing a greater number of user devices to receive the traffic flow.

IP datagrams corresponding to a multicast traffic flow are addressed to a single IP destination address identifying a multicast group. A user device accesses an IP multicast traffic flow by joining the multicast group associated with the traffic flow. A user device in turn joins a multicast group by submitting an Internet Group Management Protocol (IGMP) join request to the access network providing access to one or more core networks delivering multicast traffic.

A drawback of IGMP is that it does not allow for differentiation among user systems or user devices. As a result, all IGMP join requests are typically granted without deliberation, and any user device may typically join a multicast group. In a resource-constrained network, this may result in over-subscription, which may in turn cause problems, such as packet loss and delay, adversely affecting services provided by the access network. Where IP multicasting is used to deliver video services, such problems can seriously undermine the ability of content providers to deliver high-quality video service. Video services are extremely sensitive to data loss and delay. As result, over-subscription may severely affect the quality of video services delivered using IP multicasting. While Reservation Protocol (RSVP) may solve some of the problems associated with managing IP multicast traffic bandwidth, RSVP is an upper-layer protocol that relies on application programs generating RSVP messages to request bandwidth. Accordingly, RSVP may not be used to prevent over-subscription where multicast groups are joined by clients that are not RSVP-aware. For these and other reasons, traditional IP multicasting may be insufficient for providing video and other services sensitive to data loss and delay.

SUMMARY OF THE INVENTION

According to the present invention, disadvantages and problems associated with IP multicasting are substantially reduced or eliminated.

A system for managing access to IP multicast traffic includes a join request manager within an access router. The access router includes a central processing unit (CPU) and a memory unit. The access router replicates multicast traffic flows for communication to one or more user devices within user systems coupled to the access router using a link. The join request manager receives a request to receive a multicast traffic flow, the request being received from one of the user devices within one of the user systems, and denies the request if a system metric is above a threshold.

The present invention provides a number of important technical advantages over previous techniques for IP multicasting. Managing access to IP multicast traffic allows network access providers to prevent user devices attempting to join a multicast group from accessing more bandwidth than may have been individually provisioned for them, which in turn may substantially prevent video quality degradation. The present invention also allows network access providers to reserve a portion of the bandwidth of a link coupling a user system to an access network for unicast traffic and control the number of user devices concurrently receiving IP multicast traffic via an aggregation router or an IP-enabled digital subscriber line access multiplexer (DSLAM), whichever may be functioning as an access router. Controlling the number of user devices accessing multicast traffic may be important where the maximum bandwidth output of an access router, such as a node router processor (NRP), is limited. Moreover, the present invention also enables network access providers to deny user devices access to IP multicast traffic when granting such access would result in a degradation of services being provided to other user devices. For example, a heavily loaded access router may deny an IGMP join request when granting the request would adversely affect the quality of video service being delivered to other user devices.

Systems and methods incorporating one or more of these or other technical advantages are well suited for managing customer access to the IP multicast traffic. Other technical advantages are readily apparent to those skilled in the art from the following figures, descriptions, and claims.

BRIEF DESCRIPTION OF THE DRAWINGS

To provide a more complete understanding of the present invention and the features and advantages thereof, reference is made to the following description, taken in conjunction with the accompanying drawings, in which:

FIG. 2 illustrates an exemplary method for managing access to IP multicast traffic.

DETAILED DESCRIPTION OF THE INVENTION

Figure 1:
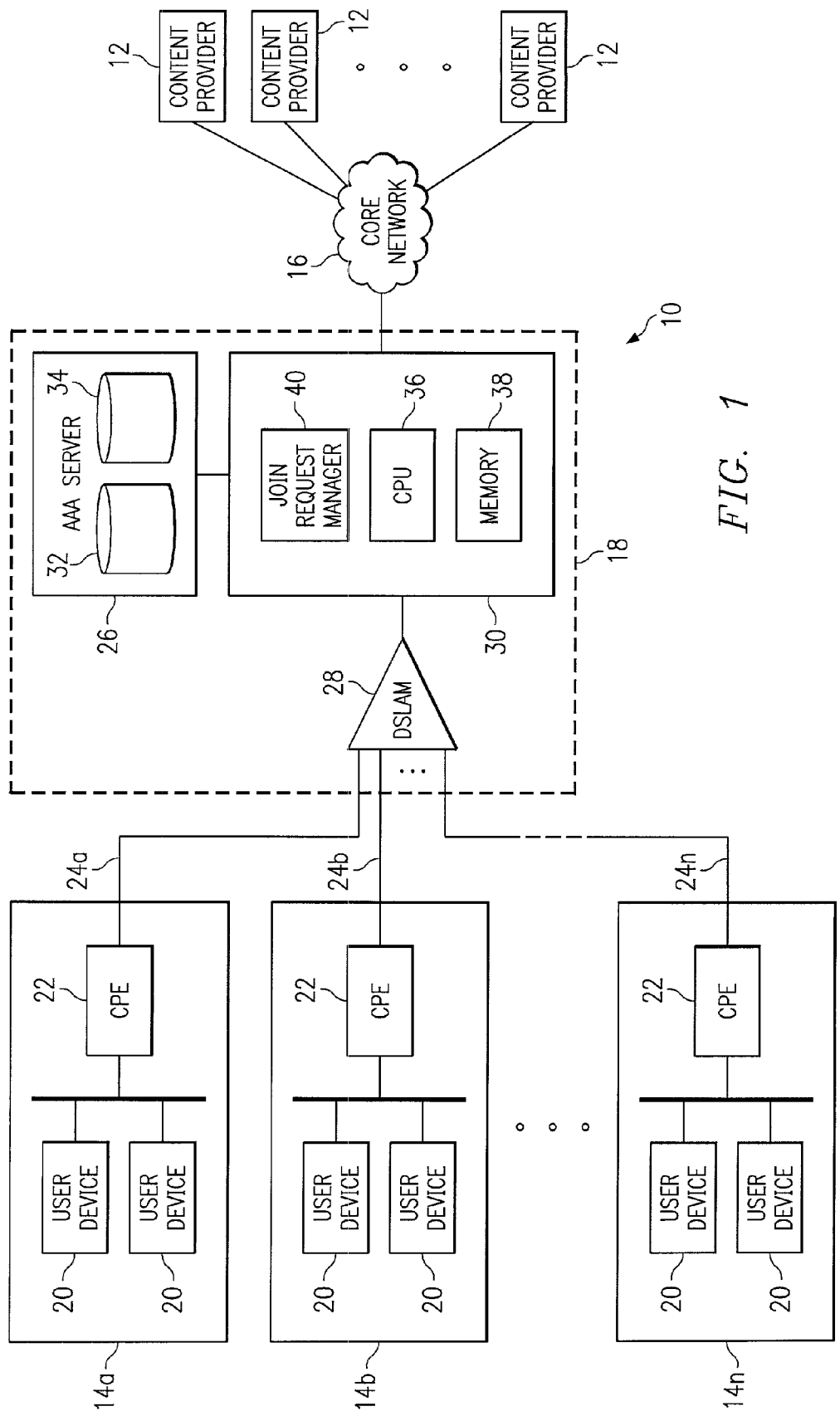
FIG. 1 illustrates an exemplary communication system for IP multicasting.

FIG. 1 illustrates an exemplary communication system 10 for IP multicasting. In communication system 10, one or more content providers 12 may provide content to one or more user systems 14 via a core network 16 and an access network 18. Content may include audio, video, multimedia, or other suitable data appropriate for IP multicasting. Content providers 12, user systems 14, core network 16, and access network 18 may be coupled using suitable wireline or wireless links and may communicate IP datagrams in any appropriate manner. For example, the links coupling user systems 14 to access network 18 may be digital subscriber line (DSL) links, and data may be communicated between user systems 14 and access network 18 using IP over asynchronous transfer mode (ATM). In addition, access network 18 and core network 16 may communicate with each other using IP over ATM over synchronous optical network (SONET). These protocols are purely exemplary and presented merely for purposes of teaching the invention. A person skilled in the art will appreciate that other suitable protocols may be used, where appropriate, without departing from the scope of the present invention.

Content providers 12 may receive or locally generate content, which may be encoded using MPEG-1, MPEG-2, MPEG-4, or any other appropriate coding algorithm. Once encoded, content may be encapsulated in IP datagrams for transmission to user systems 14. The size of the IP datagrams carrying content may be maximized to reduce routing overhead. The IP datagrams may in turn be placed in ATM frames or other data units according to particular needs. In an IP multicasting environment, multicast traffic streams generated by content providers 12 are each addressed to different multicast groups, which are specified by class-D IP addresses. Accordingly, a single multicast traffic stream, commonly referred to as a "channel," is identified by a single class-D IP address. Herein, the terms "multicast traffic flow," "channel," and "multicast group" may be used interchangeably, where appropriate. Additionally, the terms "flow" and "stream" may be used interchangeably, where appropriate. Content providers, 12 may each provide multiple channels of content. Multicast channels may be used to provide, for example, video streams for simultaneous viewing by multiple users. Multicast video channels may include broadcast television and cable channels such as bundled commercial channels, basic network television channels, premium channels, pay-per-view channels, and public channels. Multicast video channels may also include special interest group channels, local channels, webcam channels, e-learning channels, local advertisement channels, and any other appropriate channels. Special interest group channels may target niche audiences having potential for rapid growth, and local channels may spotlight local cultural, sporting, or other events. Webcam channels may, for example, permit mobile or stationary customers to monitor a premises, such as a home, apartment complex, or daycare center, and enable security agencies to provide enhanced home-video services. E-learning channels may provide on-line learning and educational services. Local advertisement channels may provide a source of incremental revenue for content providers 12.

User systems 14 may each serve one or more businesses, residences, apartment complexes, or any other appropriate user organizations or locations. Within exemplary user system 14, one or more user devices 20 capable of accessing IP multicast traffic may be coupled to customer premises equipment (CPE) 22 using an Ethernet local area network (LAN). User system 14 may simply include a PC coupled to a DSL modem providing a connection to a central office (CO). User devices 20 may include personal computers (PCs), conventional television (TVs) coupled to set top boxes (STBs), or any other suitable user devices 20 for accessing IP multicast traffic. CPE 22 may provide connections to access network 18 over access links 24, which may provide a DSL link between user systems 14 and access network 18. Although the links between access network 18 and user systems 14 are primarily described as DSL links, access links 24 may in fact include any suitable wireline or wireless links for communicating data in a suitable manner or using a suitable communication protocol. User devices 20 may access multicast channels by submitting to access network 18 IGMP join requests specifying the IP addresses of the corresponding multicast groups. An IGMP join request may also specify the IP address of user system 14 or user device 20 that generated the request.

Core network 16 may include any network capable of delivering IP multicast traffic to access network 18. For example, core network 16 may be a metropolitan area network (MAN), a wide area network (WAN), or a global network such as the Internet, or any other suitable wireline, wireless, or other multicast-enabled network. Core network 16 may be coupled to multiple content providers, each providing one or more channels of content to user systems 14. While core network 16 in exemplary communication system 10 is coupled to only one access network 18, core network 16 may be coupled to multiple access networks 18, each providing one or more user systems 14 access to core network 16, according to particular needs. Core network 16 may contain multiple routers and other suitable network devices coupled using any suitable wireline or wireless links. The routers and links within core network 16 may deliver multicast traffic generated by content providers 12 to one or more access networks 18 on demand from users devices 20 within user systems 14.

In an IP multicasting environment, core network 16 receives one copy of an IP multicast traffic flow from a content provider 12 and replicates the traffic flow at each point in the core network where the network paths leading to various user systems 14 accessing the multicast traffic flow diverge. These network paths may be collectively referred to as a distribution tree. Because the multicast traffic flow is replicated only at points of network path divergence, a link in the distribution tree need only carry one copy of the multicast traffic flow. For example, in exemplary communication system 10, where core network 16 is coupled to only one access network 18, only one copy of a multicast traffic flow need traverse core network 16 when one or more user systems 14 access the traffic flow. The multicast traffic flow is replicated within access network 18 at the network edge and distributed to each user system 14 accessing the traffic flow. Where core network 16 is coupled to two or more access networks 18 each providing network access to one or more user systems 14 accessing the same multicast traffic flow, only one copy of the flow is carried by network links shared by the network paths leading to the user systems 14 receiving the traffic flow. The routers within core network 16 replicate the multicast traffic flow at points where the network paths leading to the different access networks 18 diverge. In contrast, in a point-to-point unicasting environment, a copy of the multicast traffic flow would traverse core network 16 for each customer 14 accessing the channel. Accordingly, IP multicasting conserves core and access network bandwidth, eases the burden on individual routers in the distribution tree, and allows a greater number of user devices 20 to access multicast channels when compared with IP unicasting.

Access network 18 may provide one or more user systems 14 access to one or more core networks 16. Although access network 18 in exemplary communication system 10 is coupled to only one core network 16, access network 18 may be coupled to multiple core networks 16 in any appropriate manner. Access network 18 may include an Authentication, Authorization, and Accounting (AAA) server 26, DSLAM 28, and access router 30. The components of access network 18 may be located at one or more sites according to particular needs. For example, access network 18 may reside within a point of presence (POP) having facilities at one or more locations.

AAA server 26 may contain one or more databases containing user system profiles 32 and multicast channel profiles 34. Although databases are primarily described, user system profiles 32 and multicast channel profiles 34 may be stored using any suitable storage arrangement. Additionally, the databases containing user system profiles 32 and multicast channel profiles 34 may be logically or physically integral to or separate from AAA server 22. User system profiles 32 may include information associated with one or more user systems 14 coupled to access network 18. User system profile 32 for user system 14 may include user system bandwidth information or any other suitable information associated with user system 14. User system bandwidth information may include any information relating to the bandwidth of access link 24 coupling user system 14 to access network 18. For example, in one embodiment, user system bandwidth information reflects the maximum amount of bandwidth over access links 24 that may be used by multicast traffic. This amount may be stated in terms of bytes or other suitable data units per second, a percentage of total bandwidth (multicast and unicast), or in any other suitable manner. User system bandwidth information may also reflect the bandwidth over access link 24 reserved for unicast traffic or any other suitable user bandwidth information. Multicast channel profiles 34 may include information associated with one or more multicast channels. For example, in one embodiment, channel profile 34 for a multicast channel reflects the amount of bandwidth that may be used by the multicast channel en route to one or more user systems 14.

In general, access router 30 routes data communicated between user systems 14 and core network 16. For example, access router 30 may be an ATM router. Although exemplary access network 18 includes only one access router 30, access network 18 may include multiple access routers 30 coupled in any appropriate manner without departing from the scope of the present invention. Data may be communicated between access router 30 and user systems 14 using DSLAM 28, which may aggregate data traffic received from user systems 14 and forward the traffic to access router 30 over a single ATM link. Accordingly, data may be communicated between DSLAM 28 and access router 30 using IP over ATM. Access router 30 may also aggregate data traffic received from multiple user systems 14 or from multiple DSLAMs 28. Access router 30 may include central processing unit (CPU) 36, memory 38, and join request manager 40. CPU 26 may perform calculations and other appropriate tasks associated with routing or switching data units. Memory 38 may contain software and other information for directing the operations of access router 30, provide a buffer for incoming and outgoing data signals, and be used for other suitable memory-related tasks. User device 20 may access a multicast traffic flow provided by content provider 12 by submitting an IGMP join request to access router 30, requesting to join the multicast group corresponding to the traffic flow. IGMP join requests submitted by user devices 20 are handled within access router 30 by join request manager 40.

Join request manager 40 receives IGMP join requests submitted to access router 30 by user devices 20 and grants or denies the received requests according to a suitable criterion or criteria. Join request manager 40 may be logically or physically integral to or separate from access router 30 or other logical or physical components of access network 18. Join request manager 40 may deny IGMP join requests in a suitable manner. In one embodiment, for example, join request manager 40 denies join requests by simply dropping the packets containing the join requests. Join request manager 40 may also grant IGMP join requests in any suitable manner. In one embodiment, join request manager 40 grants join requests by communicating the join requests to one or more other devices for further processing, such as verifying whether user system 14, user device 20 or the user has access privileges needed to access the requested multicast traffic flow. Join request manager 40 may be implemented in software, hardware, or a combination of software and hardware.

In one embodiment, join request manager 40 denies IGMP join requests when access network 18 may not accommodate the requested multicast traffic. For example, join request manager 40 may deny a join request when access router 30 does not have enough resources available to deliver the requested multicast traffic flow. The availability of access router resources may be measured in terms of the utilization of access router CPU 36, the usage of access router memory 38, the bandwidth output of access router 30, or any other suitable resources or system metrics, alone or in a suitable combination. Herein, reference to metrics is meant to include any aspect of the operation of a communication system bearing on the communication of data through the system. In one embodiment, join request manager 40 denies IGMP join requests when the utilization of access router CPU 36 or the usage of access router memory 38 is at or above a particular threshold, beyond which operation of access router 30 may be impaired. For example, join requests may be denied when the utilization of access router CPU 36 is at or above eighty-five percent of the capacity of access router CPU 36. Join request manager 40 may also deny join requests when access router memory 38 is ninety percent full. Access router memory 38 may provide buffer memory for incoming and outgoing traffic. In one embodiment, join request manager 40 determines the usage of access router memory 38 by determining the level of usage of the buffer memory. Access router memory 38 may also provide working memory for the processing of incoming and outgoing traffic. In one embodiment, join request manager 40 determines the usage of access router memory 38 by determining the level of usage of the working memory. Join request manager may also check both the buffer memory and the working memory to determine the usage of access router memory 38. Although certain techniques for determining the usage of access router memory 38 are primarily described, join request manager 40 may determine the level of usage of access router memory 38 using any suitable techniques. Similarly, any suitable techniques for determining the level of utilization of access router CPU 36 may be used without departing from the scope of the present invention.

Join request manager 40 may also deny IGMP join requests when the bandwidth output of access router 30 may not accommodate the requested multicast traffic. For example, join request manager 40 may deny IGMP join requests when a particular number of multicast streams are already being delivered by access router 30. Join request manager 40 may also deny a join request when the difference between the maximum aggregate multicast bandwidth output of access router 30 and the actual aggregate multicast bandwidth output of access router 30 is less than the amount of bandwidth the requested multicast traffic flow may require. In this way, join request manager 40 may control the number of user systems 14 and user devices 20 concurrently receiving multicast traffic via access router 30 and the aggregate bandwidth of all multicast traffic being delivered by access router 30. The maximum aggregate multicast bandwidth output of access router 30 may be set by the network access provider operating access router 30. The maximum aggregate multicast bandwidth output of access router 30 may also be a function of the bandwidth output capacity of access router 30, DSLAM 28, or other network device or any other suitable performance characteristic of access router 30, DSLAM 28, or other network device. Join request manager 40 may determine the maximum aggregate multicast bandwidth output of access router 30 in any suitable manner. For example, the maximum aggregate multicast bandwidth output of access router 30 may be stored in memory accessible to join request manager 40. Join request manager 40 may also determine the actual aggregate multicast bandwidth output of access router 30 using any suitable techniques. The maximum and actual aggregate multicast bandwidth output of access router 30 may be stated in terms of bytes or other suitable data units per second, a percentage of total bandwidth (multicast and unicast), or in any other suitable manner. Join request manager 40 may determine the amount of bandwidth the requested multicast traffic flow may require by accessing multicast channel profile 34 for the requested multicast traffic flow.

Join request manager 40 may also deny IGMP join requests when access links 24 may not accommodate requested IP multicast traffic. For example, join request manager 40 may deny an IGMP join request submitted by user device 20 within user system 14a when there is not enough bandwidth available over access link 24a to deliver the requested multicast traffic flow to user system 14a. In one embodiment, join request manager 40 determines whether there is enough bandwidth available over access link 24 to deliver a multicast traffic flow by comparing the amount of bandwidth available for multicast traffic over access link 24 with the bandwidth that the requested multicast traffic flow may require. Join request manager 40 may determine the amount of bandwidth available for multicast traffic over access link 24 by subtracting the amount of bandwidth over access link 24 being used by multicast traffic from the maximum amount of bandwidth over access link 24 that may be used by multicast traffic. Join request manager 40 may use any suitable techniques to determine the amount of bandwidth over access link 24 being used by multicast traffic. Join request manager 40 may determine the maximum amount of bandwidth over access link 24 that may be used by multicast traffic by accessing user system profile 32 in AAA server 26 for user system 14 coupled to access network 30 by access link 24. Join request manager 40 may determine the amount of bandwidth the requested multicast traffic may require by accessing channel profile 34 for the requested multicast traffic flow. Accordingly, network access providers may reserve a percentage of the total bandwidth over each access link 24 for unicast traffic, which may be critical for some applications. The percentage of bandwidth reserved for unicast traffic may vary from user system 14 to user system 14 and may be as low as zero percent or as high as one-hundred percent, according to particular needs.

FIG. 2 illustrates an exemplary method for managing access to IP multicast traffic. The method begins at step 100, where join request manager 40 receives an IGMP join request from user device 20. At step 102, join request manager 40 determines whether the utilization of access router CPU 36 is above a set threshold, beyond which operation of access router 30 may be impaired. If the utilization of access router CPU 36 is above the set threshold, the method proceeds to step 104, where join request manager 40 denies the IGMP request by dropping the packet or packets containing the join request, and the method ends. If the utilization of access router CPU 36 is at or below the set threshold, the method proceeds to step 106, where join request manager 40 determines whether the usage of access router memory 38 is above a set threshold, beyond which operation of access router 30 may be impaired. If the usage of access router memory 38 is above the set threshold, the method proceeds to step 104, and the method ends. If, on the other hand, the usage of access router memory 38 is at or below the set threshold, the method proceeds to step 108

At step 108, join request manager 40 determines whether the maximum aggregate multicast bandwidth output of access router 30 and the actual aggregate multicast bandwidth output of access router 30 is less than the amount of bandwidth the requested multicast traffic flow may require. If the difference is less than the amount of bandwidth that may be required, the method proceeds to step 104, and the method ends. If the difference is not less than may be required, the method proceeds to step 110, where join request manager 40 determines whether there is enough bandwidth available over access link 24 coupling access network 18 to user system 14 in which user device 20 is located to deliver the requested multicast traffic flow to user system 14. As described above, join request manager 40 determines whether there is enough bandwidth available over an access link 24 to deliver a multicast traffic flow by comparing the amount of bandwidth available for multicast traffic over access link 24 with the bandwidth that the requested multicast traffic flow may require. If there is not enough bandwidth available over access link 24, the method proceeds to step 104, where join request manager 40 denies the join request, and the method ends. If there is enough bandwidth, the method proceeds to step 112, where join request manager grants the join request by communicating the join requests to one or more other devices for further processing, and the method ends. Although a particular order of resource checks has been described, a person of skill in the art will appreciate that any suitable order, subset, or combination of resource checks may be performed to meet particular needs without departing from the scope of the present invention. Moreover, in addition or as alternatives to those described, any suitable resources or metrics may be checked by join request manager 40 to determine whether to deny IGMP join requests.

Although the present invention has been described with one embodiment, divers changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for managing access to IP multicast traffic, comprising:
 a join request manager within an access router, the access router comprising a central processing unit (CPU) and a memory unit and operable to replicate multicast traffic flows for communication to one or more user devices within user systems coupled to the access router using a link, the join request manager operable to:
 receive a request to receive a multicast traffic flow, the request being received from one of the user devices within one of the user systems; and
 deny the request if a system metric is above a threshold by dropping one or more packets containing the request;
 wherein the system metric is an aggregate multicast bandwidth output of the access router; and
 wherein the threshold is equal to a maximum aggregate multicast bandwidth output of the access router minus a bandwidth output required to deliver the multicast traffic flow to the user device.

2. The system of claim 1, wherein the maximum aggregate multicast bandwidth output of the access router is equal to a maximum aggregate bandwidth output minus an aggregate bandwidth output reserved for unicast traffic.

3. The system of claim 1, wherein the join request manager determines the bandwidth output required to deliver the multicast traffic flow to the user device by accessing a channel profile corresponding to the multicast traffic flow contained in an authentication, authorization, and accounting (AAA) server.

4. The system of claim 1, wherein the request is an Internet group management protocol (IGMP) join request.

5. A method for managing access to IP multicast traffic, comprising:
  receiving a request to receive a multicast traffic flow, the request being received from a user device within a user system coupled to an access router using a link, the access router comprising a central processing unit (CPU) and a memory unit;
  denying the request if a system metric is above a threshold by dropping one or more packets containing the request;
  wherein the system metric is an aggregate multicast bandwidth output of the access router; and
  wherein the threshold is equal to a maximum aggregate multicast bandwidth output of the access router minus a bandwidth output required to deliver the multicast traffic flow to the user device.

6. The method of claim 5, wherein the maximum aggregate multicast bandwidth output of the access router is equal to a maximum aggregate bandwidth output minus an aggregate bandwidth output reserved for unicast traffic.

7. The method of claim 5, further comprising determining, at a join request manager, the bandwidth output required to deliver the multicast traffic flow to the user device by accessing a channel profile corresponding to the multicast traffic flow contained in an authentication, authorization, and accounting (AAA) server.

8. The method of claim 5, wherein the request is an Internet group management protocol (IGMP) join request.

9. A system for managing access to IP multicast traffic, comprising:
  a join request manager within an access router, the access router comprising a central processing unit (CPU) and a memory unit and operable to replicate multicast traffic flows for communication to one or more user devices within user systems coupled to the access router using a link, the join request manager operable to:
    receive an Internet group management protocol (IGMP) join request, the request being received from one of the user devices within one of the user systems and communicated using one or more packets; and
    drop the one or more packets if:
      utilization of the CPU is above a first threshold, the utilization of the CPU being measured in terms of a percentage of a maximum processing capacity of the CPU, the utilization of the CPU above the first threshold impairing operation of the access router;
      usage of the memory unit is above a second threshold, the usage of the memory unit being measured in terms of a percentage of a maximum storage capacity of the memory unit, the utilization of the CPU above the second threshold impairing operation of the access router;
      an aggregate multicast bandwidth output of the access router is above a third threshold equal to a maximum aggregate multicast bandwidth output of the access router minus a bandwidth output required to deliver the multicast traffic flow to the user device, the maximum aggregate multicast bandwidth output of the access router being equal to a maximum aggregate bandwidth output minus an aggregate bandwidth output reserved for unicast traffic; or
      an aggregate multicast bandwidth over the link is above a fourth threshold equal to a maximum aggregate multicast bandwidth over the link minus a bandwidth required to deliver the multicast traffic flow to the user device, the maximum aggregate multicast bandwidth over the link being equal to a maximum aggregate bandwidth minus an aggregate bandwidth output reserved for unicast traffic.

10. A method for managing access to IP multicast traffic, comprising:
  receiving a request to receive a multicast traffic flow, the request being received from a user device within a user system coupled to an access router using a link, the access router comprising a central processing unit (CPU) and a memory unit;
  denying the request if a system metric is above a threshold by dropping one or more packets containing the request;
  wherein the system metric is an aggregate multicast bandwidth over a link coupling the user system to the access router; and
  wherein the threshold is equal to a maximum aggregate multicast bandwidth over the link minus a bandwidth required to deliver the multicast traffic flow to the user device.

11. The method of claim 10, wherein the maximum aggregate multicast bandwidth over the link is equal to a maximum aggregate bandwidth minus an aggregate bandwidth output reserved for unicast traffic.

12. The method of claim 10, further comprising determining, at a join request manager, the maximum aggregate multicast bandwidth over the link by accessing user system bandwidth information in a user system profile corresponding to the user system contained in an authentication, authorization, and accounting (AAA) server.

13. The method of claim 10, further comprising determining, at a join request manager, the bandwidth required to deliver the multicast traffic flow to the user device by accessing a channel profile corresponding to the multicast traffic flow contained in an authentication, authorization, and accounting (AAA) server.

14. A system for managing access to IP multicast traffic, comprising:
  a join request manager within an access router, the access router comprising a central processing unit (CPU) and a memory unit and operable to replicate multicast traffic flows for communication to one or more user devices within user systems coupled to the access router using a link, the join request manager operable to:
    receive a request to receive a multicast traffic flow, the request being received from one of the user devices within one of the user systems; and
    deny the request if a system metric is above a threshold by dropping one or more packets containing the request;

wherein the system metric is an aggregate multicast bandwidth over a link coupling the user system to the access router; and wherein the threshold is equal to a maximum aggregate multicast bandwidth over the link minus a bandwidth required to deliver the multicast traffic flow to the user device.

15. The system of claim 14, wherein the maximum aggregate multicast bandwidth over the link is equal to a maximum aggregate link bandwidth minus an aggregate link bandwidth output reserved for unicast traffic.

16. The system of claim 14, wherein the join request manager determines the maximum aggregate multicast bandwidth over the link by accessing user system bandwidth information in a user system profile corresponding to the user system contained in an authentication, authorization, and accounting (AAA) server.

17. The system of claim 14, wherein the join request manager determines the bandwidth required to deliver the multicast traffic flow to the user device by accessing a channel profile corresponding to the multicast traffic flow contained in an authentication, authorization, and accounting (AAA) server.

\* \* \* \* \*